(12) United States Patent
Lott

(10) Patent No.: US 6,256,685 B1
(45) Date of Patent: Jul. 3, 2001

(54) DELAY DATA BLOCK RELEASE SYSTEM IN A DISK DRIVE

(75) Inventor: Glenn Alan Lott, Berthoud, CO (US)

(73) Assignee: Adaptec, Inc., Milpitas, CA (US)

( * ) Notice: Subject to any disclaimer, the term of this patent is extended or adjusted under 35 U.S.C. 154(b) by 0 days.

(21) Appl. No.: 09/197,715

(22) Filed: Nov. 23, 1998

(51) Int. Cl.[7] .................................................. G06F 13/00
(52) U.S. Cl. ................................................. 710/52; 710/25
(58) Field of Search ......................... 360/53, 5–6, 20–28; 710/52–57, 34–35; 714/7

(56) References Cited

U.S. PATENT DOCUMENTS 5,561,823 * 10/1996 Anderson ............................... 710/52
5,710,943 * 1/1998 Burton et al. ........................... 710/52
5,758,057 * 5/1998 Baba et al. .............................. 714/7
5,909,334 * 6/1999 Barr et al. ............................... 360/53

* cited by examiner

Primary Examiner—Christopher B. Shin
(74) Attorney, Agent, or Firm—Duft, Graziano & Forest, P.C.

(57) ABSTRACT

A system for delaying the release of a memory space holding a data block in a disk drive controller until an acknowledge signal is received. The present invention is implemented in a disk drive controller having a memory buffer. The disk drive controller receives a request for data from a host device. The disk drive controller then reads the data block from the disk and stores the data block in the memory buffer. The data block is then transmitted to the host device. The host device then either transmits an acknowledge signal or a busy signal. The disk drive controller does not release the data block unless an acknowledge signal has been received.

9 Claims, 4 Drawing Sheets

DELAY DATA BLOCK RELEASE SYSTEM IN A DISK DRIVE

FIELD OF THE INVENTION

The present invention relates to a disk drive system. More particularly, the present invention relates to a disk controller. Still more particularly, the present invention relates to a disk drive controller that does not release a block of data after an acknowledge signal is received indicating that the block of data was received by a host device.

Problem

In most conventional computer systems, such as a personal computer, it is common to have a disk drive to store data. Those skilled the disk drive arts are constantly striving to increase the speed and efficiency of reading and writing data between disk drives and host devices. For purpose of the present discussion, a host device is any device in a computer system capable of reading and writing data to a disk drive. Some examples are the processor, a video card, and a printer card. The greatest problem in increasing the speed and efficiency of disk drives is that the head of the disk drive must be physically moved over the track on the disk that contains the data. The heads are located on an arm that is moved back and forth across the disk by servo motors. The positioning of the head over the disks takes the greatest amount of time in the read and write processes.

Read operations for retrieving data from a disk and transmitting the data to a host device are performed in the following manner. A disk drive controller receives a request over a bus from a host device. The disk drive controller then determines where the data is stored on the disk. The head is then positioned over the track of the disk storing the data by the disk drive controller. Data is then read from the disk by the head. The drive controller then writes the data into a memory buffer in the disk drive controller. The memory buffer stores the data until the data can be transmitted over the bus. Once the disk drive controller gains control of the bus, the data is divided into data blocks and each data block is transmitted over the bus to the host device. After a data block is transmitted to the host device, the memory in the buffer storing the data block is released and may be over-written.

When the host device receives the data block, an acknowledge signal is transmitted back to the disk drive controller. If the host device is busy and cannot receive the data block, a busy signal is transmitted back to the disk drive controller by the host device. The disk drive controller must then perform a re-try of the transmission of the data block in response to a busy signal.

A re-try is performed in the following manner. First, the disk drive controller determines if the data block is still in the memory buffer. If the data block is still stored in the memory buffer, the data is transmitted over the bus immediately. If the data block is not in the memory buffer, the disk controller must read the data block from the disk and store the data block in the memory buffer prior to a second transmission. When data block must be read from the disk in a re-try, the total time needed to transmit the data block to the host device is doubled since the re-try is effectively a second read operation from the disk. Therefore, there is a need in the disk drive art for a system that can reduce the number of re-tries the require that the data be read from the disk a second time.

Solution

The above and other problems are solved and an advance in the art is made by the delay release system. This invention has a disk drive controller that does not release a data block from a memory buffer in the controller until an acknowledge signal for the data block is received from the host device. When an acknowledge signal is received for the data block, the memory space in the memory buffer storing the data block is released and may be used to store other data. If a busy signal is received for the data block, the data block is retransmitted from the memory buffer to the host device. This eliminates the need for an additional read from a disk. Thus reducing the time required to complete a read operation for a host device.

A disk drive controller having a drive control integrated circuit containing a memory buffer and link integrated circuit having a FIFO memory buffer can perform the delay release system in the following manner. First, the drive control integrate circuit receives a request signal from a host device requesting data. The drive control integrated circuit then reads the data from the disk and writes the data into the memory buffer. After the data has been written into the buffer, the disk drive control integrated circuit divides the data into data blocks. The data blocks are then transmitted over the link interface to the link integrated circuit which receives the data block and transmits the data block over the bus to the host device.

The link integrated circuit can store up to n data blocks received from the disk drive control integrated circuit in its FIFO before transmitting the data blocks. The blocks are then transmitted to the host device from the FIFO of the link integrated circuit to the host device. The host device then transmits the acknowledge/busy signal after the transfer is attempted.

Acknowledge signals received from the host device may represent any of the nth +1 previous data blocks that have been transmitted by the disk drive control integrated circuit since n data blocks may still be in the FIFO of the link integrated circuit. In order to assure that all data blocks are in memory until the data block has been received by the host, the disk drive control integrated circuit does not release any memory space until after n+1 acknowledge signals are received. After n+1 acknowledge signals have been received, memory storing the data block transmitted n+1 times before the current data block is released. This assures that all data blocks that are currently being transmitted are still stored in the memory buffer. If a busy signal is received, the disk drive control integrated circuit resets the pointer in memory to the data block transmitted n+1 times before the current data block and retransmits all of the data block to the link integrated circuit.

DESCRIPTION OF THE DRAWINGS

The above and other features of this invention can be understood by reading the detail description below in conjunction with studying the following drawings.

DETAILED DESCRIPTION

Figure 1:
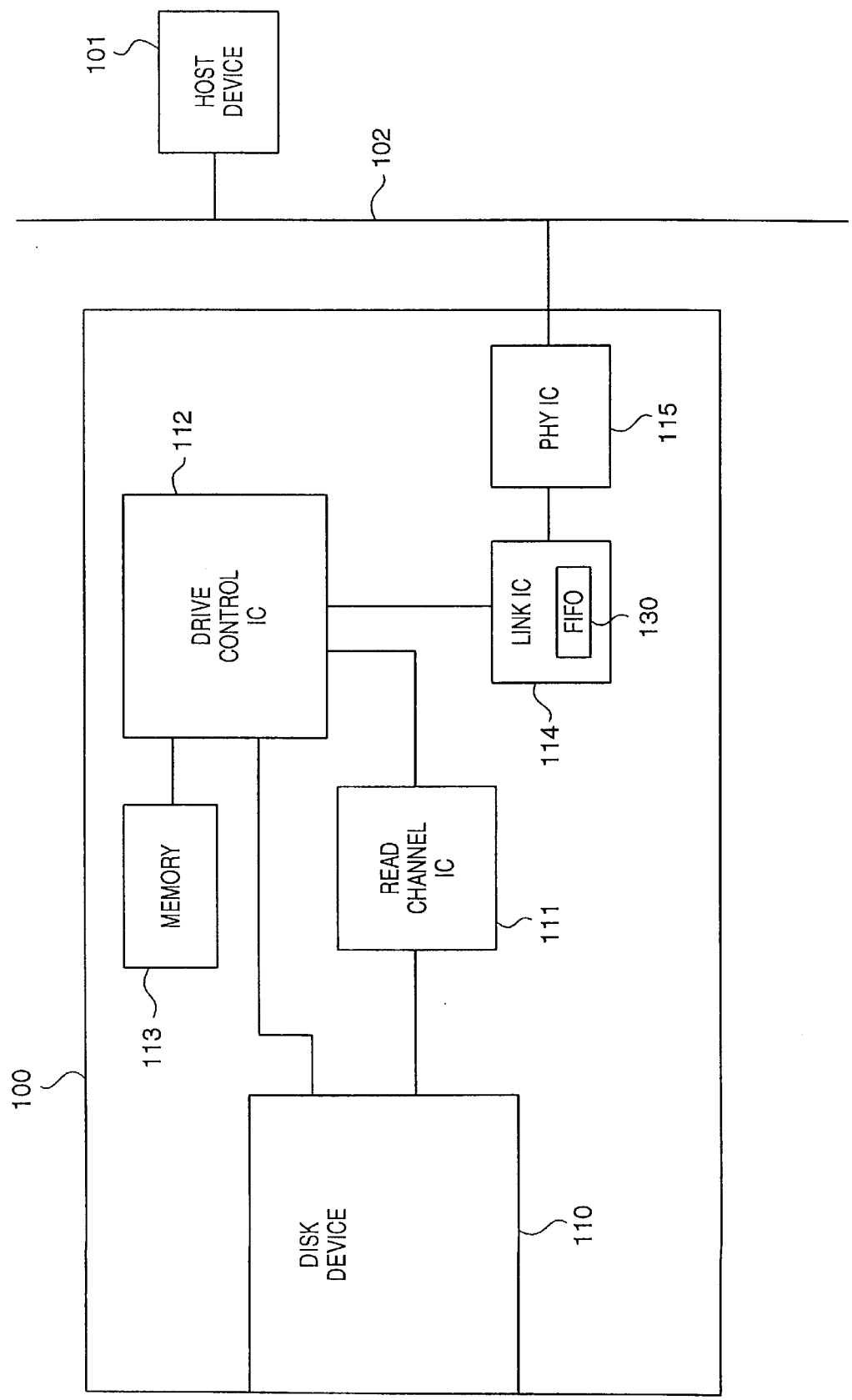
FIG. 1 illustrating a block diagram of a disk drive system incorporating this invention.

Description of a Disk Drive System—FIG. 1

FIG. 1 illustrates a disk drive system 100 that stores data for at least one host device 101. One example of host device 101 is a personal computer. Disk drive system 100 includes a magnetic disk device 110 that is coupled to a read channel integrated circuit 111 and to a drive control integrated circuit 112. Drive control integrated circuit 112 is coupled to memory 113 and to link integrated circuit 114 as well as read channel integrated circuit 111. Link integrated circuit 114 is connected to physical connection integrated circuit 115 which connects link circuit 114 to bus 102. In turn, bus 102 connects disk drive 100 to host drive 101. The connections between the above devices are conventional. Those skilled in the art will recognize that some conventional elements of disk drive system 100 have been omitted for clarity.

Disk device 110 is comprised of heads that read and write the user data to disks. The disk device 110 is a conventional disk drive such as model WNR31601A supplied by Samsung Electronics Co. Ltd. of San Jose, Calif.

Read channel integrated circuit 111 provides a system interface to disk device 110 for reading data from a disk. When data is read from the disk, read channel integrated circuit 111 receives a read signal from disk device 110 and generates the stored data from the read signal. The data is then transmitted to drive control integrated circuit 112. The read channel integrated 111 can be conventional integrated circuit such as the SSI Read Channel IC model 32P4901A supplied by Silicon Systems of Tustin Calif. A discussion of the circuitry used to write data to a disk is omitted as the writing of data is not related to the present invention.

Memory 113 is a conventional memory such as a Random Access Memory (RAM) that stores data during a data transfer from magnetic disk device 110 to host device 101. Memory 113 also stores processing instructions for drive control integrated surface 112.

Drive control integrated circuit 112 controls the operation of disk drive system 100. Drive control integrated circuit 112 uses servo data to control the positioning of the heads and disks of disk device 110. The disk control integrated circuit 112 also controls the data transfer between the disk drive system 100 and host device 101 via link integrated circuit 114. Disk control integrated circuit 112 can be adapted from the model AIC-5460 integrated circuit supplied by Adaptec Inc. of Milpitas, Calif.

Link integrated circuit 114 contains circuitry for providing an interface between disk control integrated circuit 112 and a standard bus for connecting devices in a computer system. Link integrated circuit 114 receives data from disk control integrated circuit 112 and generates packets for sending data over bus 102. Link integrated circuit 114 can be a conventional integrated circuit for providing an interface with a bus such as Adaptec Link IC model AIC-4395 manufactured by Adaptec Inc. of Milpitas, Calif.

Physical connection integrated circuit 115 is connected between link integrated circuit 114 and bus 102. Physical connection integrated circuit 115 manages the analog signals which control transmission and reception of data bits across bus 102. The management of analog signals allows the packet protocol layer of link integrated circuit 114 to be independent of the physical connection between drive 100 and host device 101. One example of a conventional Physical IC 115 is an IBM 1394 PHY IC model 21S850 manufactured by IBM Microelectronics Division of Hopewell Junction, N.Y.

Bus 102 is a standard device for transfer data between devices in a computer system. Bus 102 can be a convention bus such as a standard IEEE 1394 bus. Host device 101 is connected to bus 102. Host device 101 can be any device that can receive data from disk drive system 100 such a personal computer system, a processor, or any conventional I/O device.

Those skilled in the art are aware that the functionality of drive control integrated circuit 112 and link integrated circuit 114 can be distributed among multiple interconnected integrated circuits. This invention is not restricted to a single drive control integrated circuit, but also encompasses a configuration of integrated circuits that provide an interface between host device 101 and magnetic disk device 110.

In operation, disk drive system 100 transfers data to host device 101 in the following manner. Drive control integrated circuit 112 receives a request for data from host device 101 via link integrated circuit 114. The drive control integrated circuit 112 uses servo data to direct the positioning of the magnetic disk and heads over the magnetic to read the data from a disk The heads read the data from the disks and generate signals which are sent to read channel integrated circuit 111. Read channel integrated circuit 111 receives the signals and converts the signals into digital machine-readable data. The data is then transmitted to drive control integrated circuit 112 which saves the data in memory 113. Drive control integrated circuit then transmits the data in blocks to link integrated circuit 114. Once a data block is transmitted to link integrated circuit 114, the memory space storing the data block in memory 113 is released and can be overwritten.

Link integrated circuit 114 receives the data block and stores the data block in a memory such as FIFO 150. Packets for the data blocks are then generated and transfer by link integrated circuit 114 via physical connection integrated 115 and bus 102 to host device 101. When host device 101 receives the packet an acknowledge signal is transmitted over bus 102 and physical connection integrated circuit 115 back to link integrated circuit 114. The acknowledge signal is then passed to drive control integrated circuit 112. When host device 101 is busy and cannot receive a packet, a busy signal is transmitted over bus 102 and physical connection integrated circuit 115 to link integrated circuit 114. The busy signal is then transmitted back to drive control integrated circuit 112.

When a busy signal is received by drive control integrated circuit 112, a retry must be performed for the data block in the following manner. The drive control integrated circuit searches for the data in memory 113. If the data block is not in memory 113, drive control integrated circuit 112 must read the data block from the disk again. Otherwise, drive control integrated circuit 112 reads the data block from memory 113 and transmits the data block to link integrated circuit 114 again.

The system of the present invention assures that a memory space in memory 113 holding a data block is not released prior to receiving an acknowledge signal. This prevents the data block from being written over. Retries are faster since the step re-reading the data from the disk is skipped.

Figure 2:
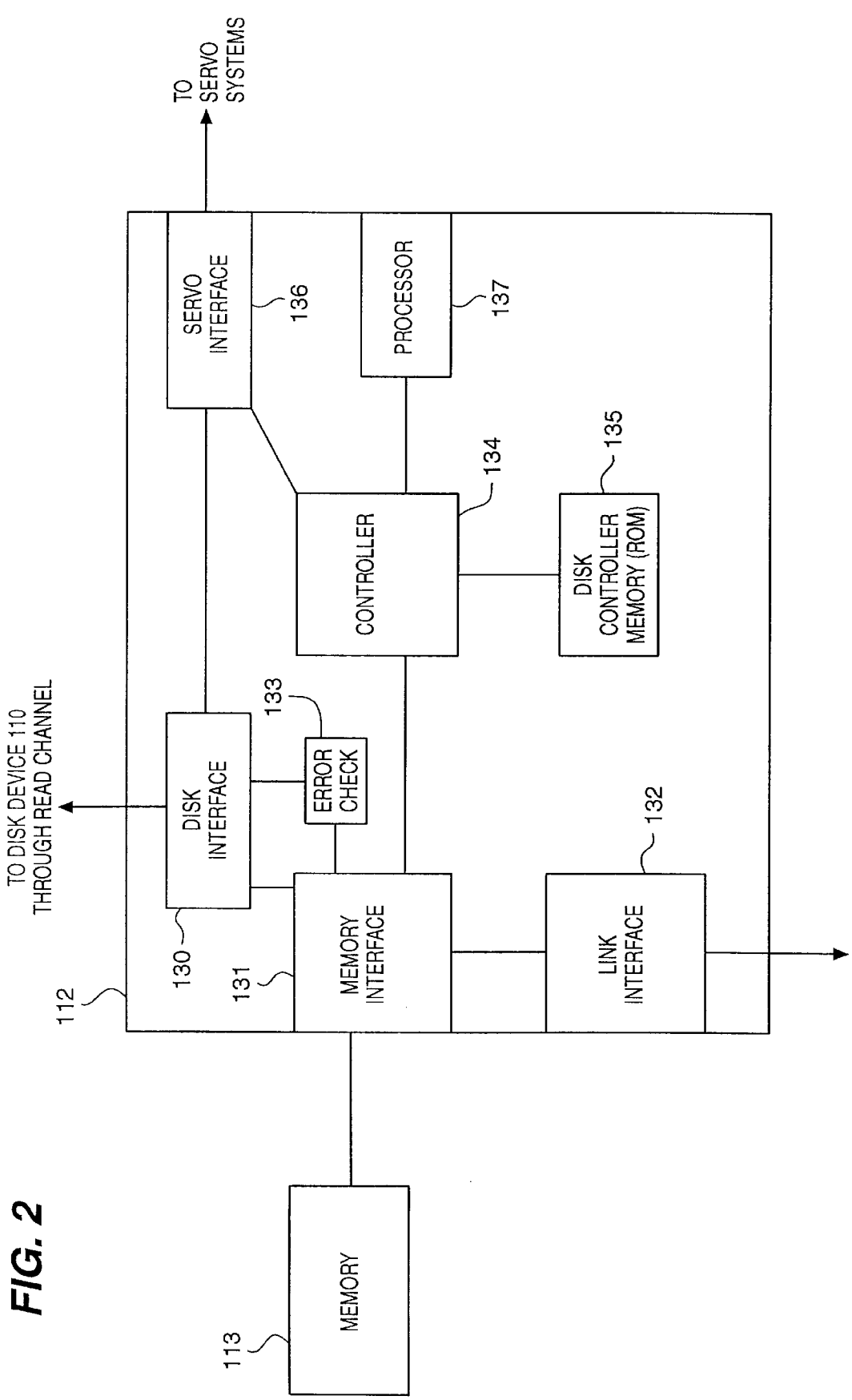
FIG. 2 illustrating a block diagram of a drive control of a disk drive system that is operational to provide a delay release system.

Description of a Drive Control lntegrated Circuit—FIG. 2

FIG. 2 illustrates a drive control integrated circuit 112 communicatively connected to memory 113. Drive control integrated circuit is comprised of: disk interface 130, memory interface 131, link interface 132, error check circuitry 133, controller 134, disk controller memory 135, servo interface 136, and processor 137. The connections between these elements can be conventional. Those skilled in the art will appreciate that some conventional elements of drive control circuitry 112 have been omitted for reasons of clarity.

Disk interface 130 exchanges user data with read and write channels over a data bus, such as a Non-return to Zero (NRZ) Bus. Memory interface 131 exchanges user data between disk interface 130 and memory 113. Data transfers are also routed through error check 133 for cyclical redundancy calculations to verify the accuracy of the data transfer. Memory interface 131 also exchanges user data between link interface 132 and memory 113. Link interface 132 exchanges user data with link integrated circuit 114.

Controller 134 controls the flow of instructions and addresses within drive control integrated circuit 112. Internal memory 135 is comprised of both Read Only Memory (ROM) and Random Access Memory (RAM) that are used to store critical instructions and routines. Internal memory 135 is not large enough to store all instructions for processor 137. Servo interface 136 receives servo data from disk interface 130 and transfers the servo data to magnetic disk device 110.

Processor 137 is the core intelligence of disk drive system 100. Processor 137 retrieves and executes instructions for directing data transfers between disk drive device 110 and host device 101. One Embodiment of processor 137 is a 16-bit digital processor based upon PINE logic provided by DSP Group INC. of Santa Clara, Calif.

Disk control integrated circuit 112 operates in the following manner to read data from disk drive device 110 and transfer the data to host device 101. Link interface 132 receives a request for data from host device 101. Link interface 132 and memory interface 131 determine if the requested data is stored in memory 113. If the data is stored in memory 113, the data is immediately transferred through memory interface 131 and link interface 132 to link integrated circuit 114. If the data is not in memory 113, the request is passed to processor 137. Processor 137 uses servo data from servo controller 136 to generate servo control signals based upon the servo data and transmits the servo control signals to magnetic disk device 110. When magnetic disk device 110 is properly positioned, the processor 137 directs disk interface 130, memory interface 131, and error check circuitry 133 to transfer the user data from the read channel integrated circuit 111 to memory 113. Processor 137 then directs memory interface 131 and link interface 132 to transfer the data in data block to link integrated circuit 114.

Link integrated circuit 114 stores each data block received in a First In First Out (FIFO) memory 150. Link integrated circuit 114 then generates packets for the data blocks and transmits the packets to host device 101 via physical connection integrated circuit 115 and bus 102. If host device 101 is busy, a busy signal is returned to link integrated circuit 114. If the packet containing the data block is received, host device 101 transmits an acknowledge signal. The acknowledge/busy signal is then transmitted from link integrated circuit to link interface 132. Link interface 132 then transmits the acknowledge/busy signal to controller 134.

If an acknowledge signal is received by controller 134, controller 134 continues operation of disk drive system 100. If a busy signal is received, controller 134 must perform a retry operation for each data block that has been transmitted prior to receiving the busy signal. In a retry operation, memory interface 131 and link interface 132 determine if the data block is still stored in memory. If the data block is still stored in memory, the data block is transmitted by memory interface 131 and link interface 132. If not the data block must be read from disk device 110 before the data block can be transmitted.

Figure 3:
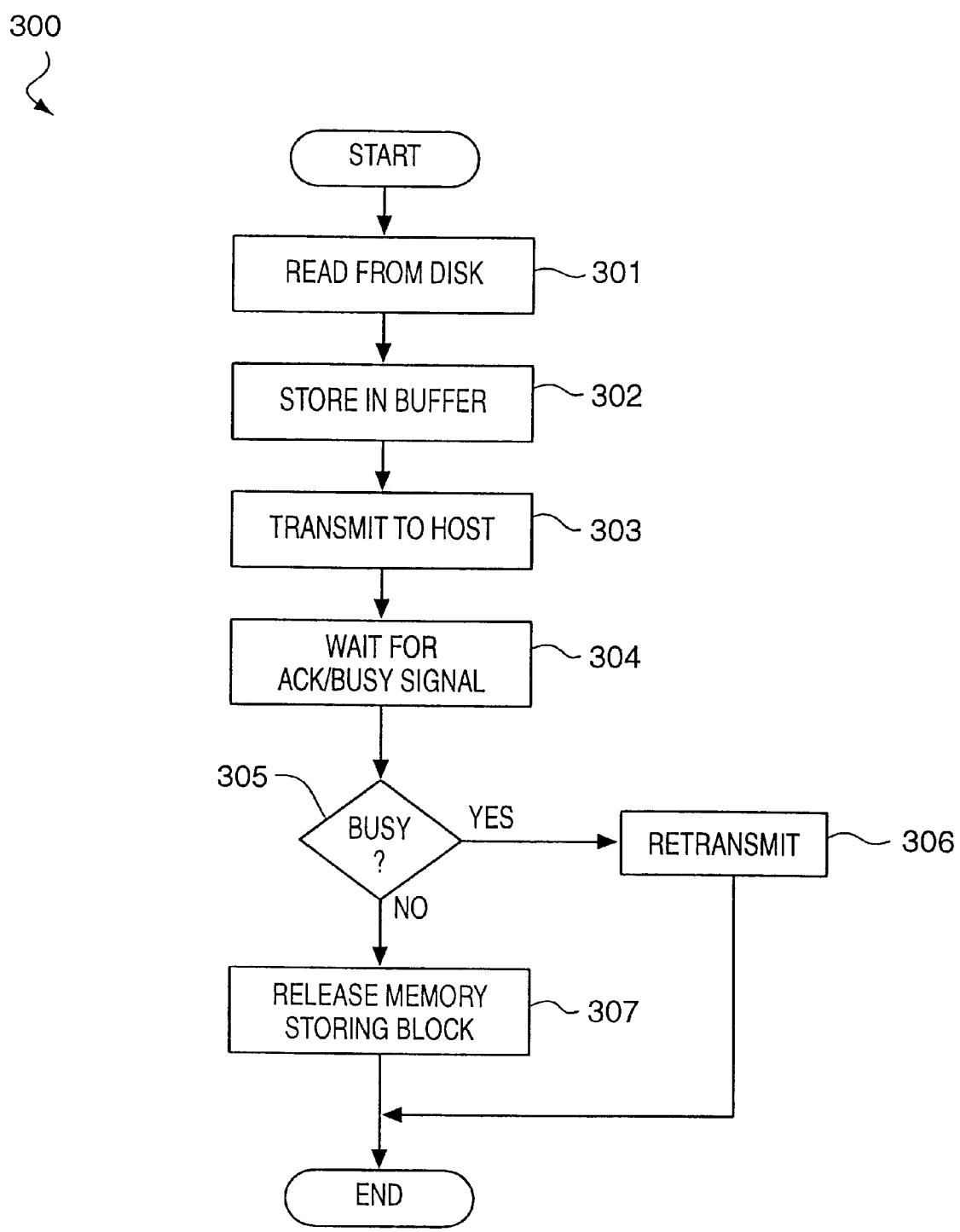
FIG. 3 illustrating a flow diagram of a process for performing a data transfer for a data block from the disk drive system to a host device.

Description of a Process for Transferring a Data Block to a Host Device—FIG. 3

FIG. 3 illustrates a process 300 that reduces the number of reads from disk device 110 needed to transfer blocks of data from disk drive system 100 to host device 101. The process 300 is the process performed on each data block to transfer the data block from disk drive system 100 to host device 101. One skilled in the art will recognize that although process 300 is the operational steps performed on each data block, a separate process is needed to implement process 300 in system that transfers more than one block of data at a time. The system process required in order to provide the operational step of process 300 in an exemplary disk drive system 100 is illustrated in FIG. 4.

Process 300 is performed by drive control integrated circuit 112 to transfer a data block read from disk drive device 110 to host device 101. Process 300 reduces the time needed to perform a retry when host device 101 is busy. The time is reduced because the data block is still stored in memory 113 and a read from disk device 110 is not necessary. The data block is stored in memory 113 until an acknowledge signal is received indicating that the data block was received by host device 101.

Process 300 begins in step 301 with a data block being received from the disk device 110 by disk interface 130. In step 302, the read data block is then stored in memory 113 by memory interface 131. The data block is then transmitted to link integrated circuit by link interface 132 in step 303. In step 304, drive control integrated circuit 112 waits to receive an acknowledge signal or a busy signal from host device 101. If an acknowledge signal is received, the memory space storing the data block in memory 113 is released in step 307 and can be used to store other data. Process 300 is then complete for the data block. If a busy signal is received, a retransmit is performed in step 306 and process 300 for the data block is complete.

Figure 4:
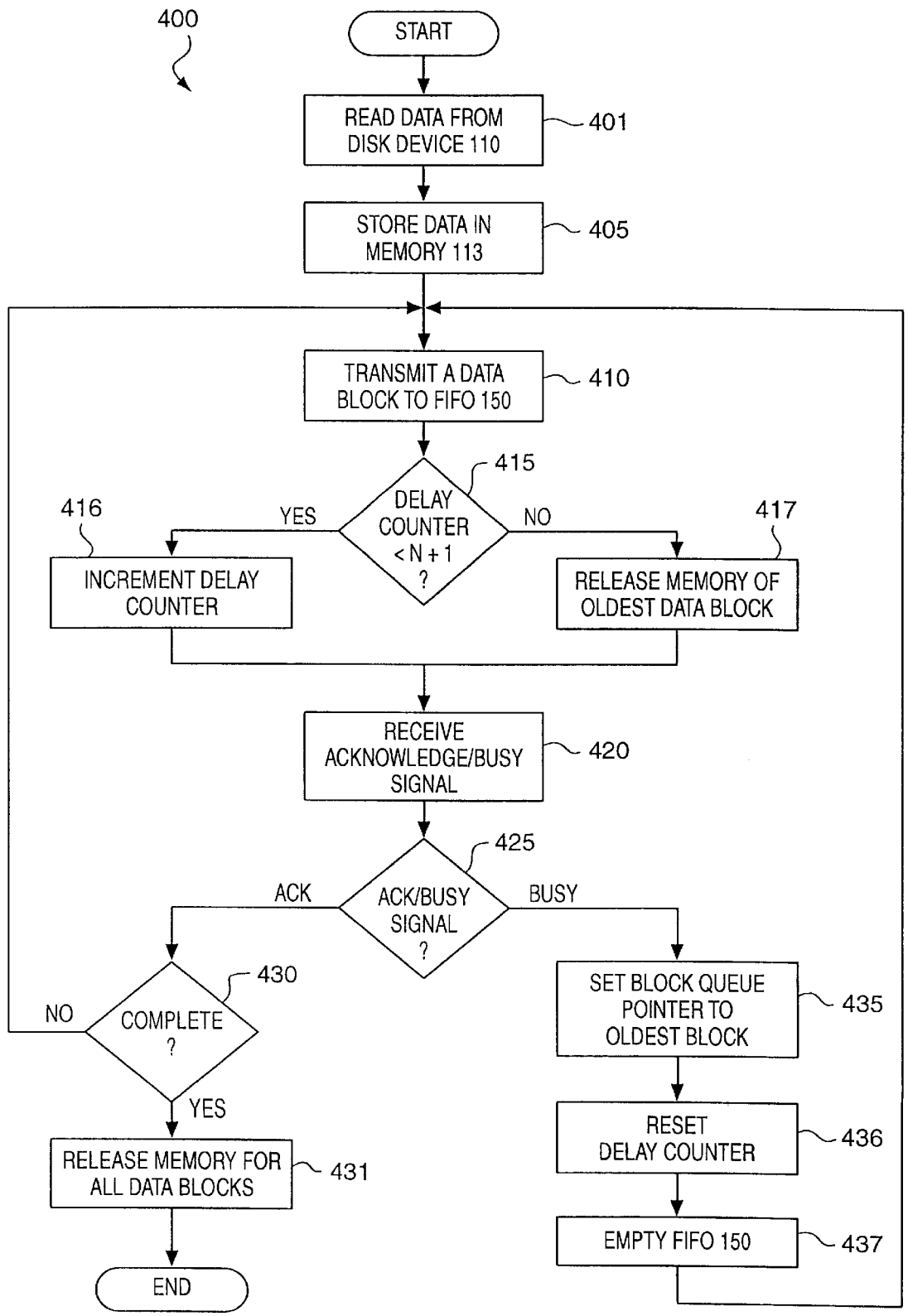
FIG. 4 illustrating a flow diagram of a process for performing a data transfer for a plurality of data blocks from the disk drive system to the host device.

Description of a Process for Transferring Blocks of Data from a Disk Drive System to a Host Device—FIG. 4

FIG. 4 illustrates the process performed drive control integrated circuit 112 to provide a process 300 for each data block transferred to host device 101 to keep the data block stored in memory 113 until an acknowledge signal is received for the data block. Process 400 begins in step 401 with the user data being read from disk device 110 by disk interface 131. In step 405, the data read from the disk is stored in data block in memory 113. In memory 113, the data blocks are maintained in a queue or in some other manner for tracking the data transmitted to host device 101. The queue can be a stack or any other equivalent for maintaining a track of the data transmitted.

In step 410, a data block is transmitted to FIFO 150 in link integrated circuit 114 by memory interface 132 and link interface 133 as described above. In step 415, processor 137 determines whether a delay counter is less than one more than the number of data blocks that can be stored in the FIFO 150. In an exemplary embodiment, the FIFO can hold four data blocks at time and step 415 would determine whether the delay counter is less than five. One greater than the number of data blocks that can be stored in the FIFO 150 is used because that is number of data blocks that have already been transmitted by drive control integrated circuit 112 before the first acknowledge/busy signal is return to drive control integrated circuit 112. This is because one data block has been transmitted to host device 101 by link integrated circuit 114 and link interface 131 has transmitted enough data blocks to fill FIFO 150 during the transmission. The first time steps 410–415 are executed the delay counter is zero.

If the delay counter is less than one greater than the number of data blocks that can be stored in FIFO 150, process 400 proceeds to step 416 and the delay counter is incremented by processor 137. No memory space is released since the FIFO 150 has not been filled and a busy signal could be for any prior data block transmitted.

If the delay counter is greater than or equal to one greater than the number of data blocks that can be stored in FIFO 150 in step 415, process 400 proceeds to step 417 and the memory space storing the oldest data block is released. The oldest data block is the data block that was transmitted the earliest with respect to the other data blocks in the transfer is released. In operation, the oldest data block in the data block queue is the data block transmitted n+2 blocks before the current block, where n is the number of data blocks that can be stored in FIFO 150.

After step 416 or step 417, drive control integrated circuit waits to receive an acknowledge/busy signal in step 420. If a busy signal is received, process 400 proceeds to step 435. If an acknowledge signal is received, process 400 proceeds to step 430.

If an acknowledge signal is received at step 425, drive control integrated circuit 112 determines whether the data transfer has been completed be transferring all of the data blocks in step 430. If the data transfer is completed, drive control integrated circuit 112 releases the memory space in memory 113 for all of the data blocks in the queue in step 431 and process 400 is completed for the data transfer. If the data transfer is not completed process 400 is repeated from step 410 for the next data block in the data block queue.

If a busy signal is received in step 425, drive control integrated circuit 112 sets a data block queue pointer to the oldest data block remaining in the data block queue in step 435. In operation, the oldest data block would be data block transmitted n+1 times before the current data block. In step 436, the delay counter is reset to zero. The FIFO in link integrated circuit 114 is then emptied in step 437. Process 400 is then repeated step 410 to retransmit the data blocks that have not been received by host device 101.

The above is a description of a system for reducing the number of reads from a disk needed to complete the transfer of data from the disk drive to a host device. It is expected that those skilled in the art can and will design systems that infringe on the invention of the above described system as set forth in the claims below either literally or through the Doctrine of Equivalents.

What is claimed is:

1. A method for determining when to release data blocks stored in a buffer during a data transfer of data read from a disk drive to a host device wherein at least one data block is read from a disk, said at least one data block is stored in said buffer, said at least one date block is transmitted from said buffer to said host device, an acknowledgment signal is received from said host device that said at least one data block has been received, and memory in said buffer that is storing said at least one data block is released responsive to receiving acknowledgment signal, said method comprising the steps of:

receiving a busy signal from said host device when said at least one data block is not received by said host device;

re-transmitting said at least one block data responsive to receiving said busy signal;

determining whether a delay counter is equal to one greater than the number of at least one data block that can be stored in a FIFO in said buffer;

incrementing said delay counter responsive to said delay counter being less than one greater than said number of blocks in said FIFO; and releasing an oldest data block from a data block queue of said FIFO in said buffer responsive to a determination that said delay counter is equal to or greater than said number of at least one data blocks in said FIFO.

2. The method of claim 1 wherein said step of re-transmitting comprises the step of:

removing all of said at least one data blocks from said FIFO;

resetting said pointer for said data block queue to said oldest data block;

resetting said delay counter to zero; and transmitting said oldest data block to said host device.

3. The method of claim 1 further comprising the steps of:

determining whether said data transfer is complete;

releasing memory space in said memory buffer storing said data blocks in said data block queue for said transfer.

4. A system for improving speed of data transfers between a disk drive device and a host device comprising:

a disk controller processor;

a memory buffer communicatively connected to said disk controller processor that maintains a data block queue;

instructions for directing said disk controller processor to receive at least one data block read from a disk via a read channel, to store said at least one data block in said memory buffer, to transmit said at least one data block to said host device, to receive an acknowledgment/busy signal, retransmit said at least one data block responsive to receiving a busy signal, release memory space in said memory buffer storing said data block responsive to receiving said acknowledgment signal, determining whether a delay counter is equal to one greater than the number of said at least one data blocks that can be stored in a FIFO in said buffer, incrementing said delay counter responsive to said delay counter being less than one greater than said number of said at least one data blocks in said FIFO, and releasing an oldest data block from data block queue in said memory buffer responsive to a determination that said delay counter is equal to or greater than said number of at least one data blocks in said FIFO; and a memory for storing said instructions that is readable by said disk control processor.

5. The system of claim 4 wherein said instructions for retransmitting said data block responsive to receiving said busy signal includes:

instructions for directing said disk controller processor to reset a pointer in said data block queue to said oldest data block in said data block queue, and transmit said at least one data block in said data block queue to said host device beginning with said oldest data block.

6. The system of claim 5 wherein said instructions further include:

instructions for directing said disk controller processor to determine when said data transfer is complete, and releasing memory space in said memory buffer storing said data block queue.

7. A disk drive system for storing data that can be transferred to a host device said disk drive comprising:

a disk drive device;

a read channel integrated circuit having a read channel for reading at least one data block from a disk in said drive device;

a disk drive controller integrated circuit connected to said read channel device to control processes in said disk drive system which includes receiving said at least one data block from said read channel integrated circuit;

a disk drive controller processor in said disk drive controller integrated circuit;

a memory buffer connected to said disk drive controller processor for storing said at least one data block in a data block queue;

instructions for directing said disk drive controller processor to store said at least one data block in said memory buffer, to transmit said at least obne data block to said host device, and to release memory space in said memory buffer storing said data block, responsive to receiving an acknowledgment signal that said data block has been receive, retransmitted said at least one data block from said memory buffer to said host device responsive to receiving a host busy signal, determining whether a delay counter is equal to one greater than the number of said at least one data blocks that can be stored in said FIFO in said buffer, incrementing said delay counter responsive to said delay counter being less than one greater than said number of blocks in said FIFO memory, and releasing an oldest data block from data block queue in said memory buffer responsive to a determination;

a disk controller processor readable memory storing said instructions;

a link integrated circuit connecting said disk controller to a bus connecting said disk drive system to said host device; and a FIFO memory in said link integrated circuit for storing said data block as said data block is being transmitted to said host device.

8. The system of claim 7 wherein said instructions directing said disk control processor to retransmits said data block comprises:

instructions for directing said disk controller processor to reset a pointer in said data block queue to said oldest data block in said data block queue, and transmit said at least one data block in said data block queue to said host device beginning with said oldest data block.

9. The system of claim 8 wherein said instructions further include:

instructions for directing said disk controller processor to determine when said data transfer is complete, and releasing memory space in said memory buffer storing said data block queue.

\* \* \* \* \*